US012651022B2

(12) United States Patent
Chundi et al.

(10) Patent No.: US 12,651,022 B2
(45) Date of Patent: Jun. 9, 2026

(54) METHODS AND APPARATUSES FOR PREVENTING SPOILERS IN AUTOCOMPLETED SEARCH QUERIES

(71) Applicant: Adeia Guides Inc., San Jose, CA (US)

(72) Inventors: Charishma Chundi, Nellore (IN);
Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/656,217

(22) Filed: May 6, 2024

(65) Prior Publication Data

US 2024/0289381 A1     Aug. 29, 2024

Related U.S. Application Data

(62) Division of application No. 17/589,338, filed on Jan. 31, 2022, now Pat. No. 12,008,036.

(51) Int. Cl.
| | |
|---|---|
| *G06F 16/70* | (2019.01) |
| *G06F 16/45* | (2019.01) |
| *G06F 16/732* | (2019.01) |
| *G06F 16/735* | (2019.01) |
| *G06F 16/738* | (2019.01) |

(Continued)

(52) U.S. Cl.
CPC ............ *G06F 16/735* (2019.01); *G06F 16/45* (2019.01); *G06F 16/732* (2019.01); *G06F 16/738* (2019.01); *G06F 16/783* (2019.01); *G06F 16/90324* (2019.01); *H04N 21/454* (2013.01); *H04N 21/812* (2013.01)

(58) Field of Classification Search
CPC .... G06F 16/732; G06F 16/735; G06F 16/738;

G06F 16/783; G06F 16/90324; H04N 21/454; H04N 21/4828; H04N 21/812; H04N 21/84; H04N 21/8549
See application file for complete search history.

(56) References Cited

U.S. PATENT DOCUMENTS

| | | | |
|---|---|---|---|
| 7,801,888 B2 | 9/2010 | Rao et al. | |
| 8,825,576 B2 | 9/2014 | Aravamudan et al. | |

(Continued)

FOREIGN PATENT DOCUMENTS

| | | | |
|---|---|---|---|
| CN | 107247802 A | | 10/2017 |
| CN | 108763369 A | * | 11/2018 |
| JP | 2022131963 A | * | 9/2022 |

OTHER PUBLICATIONS

Article entitled "Spoiler Protection 2.0", by wecdev.com, dated Apr. 30, 2020, available at https://chrome.google.com/webstore/detail/spoiler-protection-20/eelacikjipinmdingehjfdjcfegclmkg (Year: 2020).

(Continued)

*Primary Examiner* — Mahesh H Dwivedi
(74) *Attorney, Agent, or Firm* — HG LAW LLP

(57) ABSTRACT

Systems and methods are provided for preventing spoilers in autocompleted search queries. One example method includes, in response to detecting a user interaction at a computing device associated with a search query, identifying a media content history comprising one or more media content items. A predicted search query based on the user interaction and the media content history is generated, and the predicted search query is generated for output, at the computing device.

18 Claims, 9 Drawing Sheets

(51) Int. Cl.

| | |
|---|---|
| *G06F 16/783* | (2019.01) |
| *G06F 16/9032* | (2019.01) |
| *H04N 21/454* | (2011.01) |
| *H04N 21/81* | (2011.01) |

(56) References Cited

U.S. PATENT DOCUMENTS

| | | | | |
|---|---|---|---|---|
| 9,357,267 | B2 * | 5/2016 | Gregov | H04N 21/4722 |
| 9,635,337 | B1 * | 4/2017 | Dantzler | G06F 16/735 |
| 10,091,149 | B2 | 10/2018 | Jung | |
| 10,257,547 | B1 | 4/2019 | Yan et al. | |
| 10,417,272 | B1 | 9/2019 | Carmack et al. | |
| 10,555,023 | B1 * | 2/2020 | McCarthy | H04N 21/8549 |
| 11,019,300 | B1 * | 5/2021 | Baxendale | H04N 21/47815 |
| 11,188,584 | B1 * | 11/2021 | Allen | G06F 16/345 |
| 11,388,473 | B1 | 7/2022 | Grover | |
| 2007/0168389 | A1 * | 7/2007 | Lipscomb | G06Q 30/02 |
| 2010/0094855 | A1 * | 4/2010 | Rouhani-Kalleh | G06F 16/951 |
| | | | | 707/706 |
| 2014/0214980 | A1 * | 7/2014 | Jung | H04L 51/212 |
| | | | | 709/206 |
| 2014/0297260 | A1 | 10/2014 | Allen | |
| 2015/0113058 | A1 | 4/2015 | Zhang et al. | |
| 2015/0339382 | A1 * | 11/2015 | Skolicki | H04N 21/8549 |
| | | | | 707/722 |
| 2015/0382061 | A1 | 12/2015 | Maisenbacher et al. | |
| 2016/0165298 | A1 * | 6/2016 | Sapunova | H04N 21/44204 |
| | | | | 725/61 |
| 2017/0097932 | A1 | 4/2017 | Bakshi et al. | |
| 2018/0152759 | A1 | 5/2018 | Miller | |
| 2019/0149889 | A1 | 5/2019 | Agarwal et al. | |
| 2019/0171723 | A1 * | 6/2019 | Peterson | G06F 16/48 |
| 2019/0253757 | A1 | 8/2019 | Leister | |
| 2020/0122041 | A1 | 4/2020 | Sherwani et al. | |
| 2020/0125600 | A1 * | 4/2020 | Jo | G06F 16/784 |
| 2020/0380041 | A1 * | 12/2020 | Aher | G06F 16/90332 |
| 2020/0404372 | A1 * | 12/2020 | Di Loreto | H04N 21/44204 |
| 2021/0029419 | A1 * | 1/2021 | Puniyani | H04N 21/435 |
| 2021/0352382 | A1 | 11/2021 | Channapragada et al. | |
| 2021/0374179 | A1 | 12/2021 | Aher et al. | |
| 2021/0406326 | A1 | 12/2021 | Ebersol et al. | |
| 2023/0132764 | A1 * | 5/2023 | Channapragada | |
| | | | | H04N 21/4316 |
| | | | | 386/241 |
| 2023/0244717 | A1 | 8/2023 | Chundi et al. | |
| 2024/0064363 | A1 * | 2/2024 | Sharifi | G06V 20/40 |

OTHER PUBLICATIONS

Article entitled "Spoiler Slayer: An open-source browser extension to block spoilers", by brettp, dated Feb. 3, 2020, available at https://github.com/brettp/spoiler-slayer (Year: 2020).

* cited by examiner

| Title | Main Event Identification | Main Event Description | Plot Keywords | Spoiler (Confidence Level) | Time Stamp |
|---|---|---|---|---|---|
| The Good Doctor, S2 E4 | 001S2E4 | Shaun has a Childhood Flashback | Shaun, Childhood, Flashback | No (89%) | 00:04:32 |
| The Good Doctor, S2 E4 | 002S2E4 | Carly and Shaun Breakup | Carly, Shaun, Breakup | Yes (99%) | 00:08:42 |
| The Good Doctor, S2 E4 | 003S2E4 | Shaun has a Breakdown | Shaun, Breakdown | No (50%) | 00:20:31 |
| House S7 E2 | 001S7E2 | Cuddy and House go to Work | Cuddy, House, Work | No (68%) | 00:09:55 |
| House S7 E2 | 002S7E2 | House Announces he and Cuddy are Dating | House, Cuddy, Dating | Yes (78%) | 00:15:32 |
| House S7 E2 | 003S7E2 | Cuddy Appoints New Supervisor | Cuddy, Supervisor | Yes (52%) | 00:27:11 |
| House S7 E2 | 004S7E2 | Della Agrees to Transplant | Della, Transplant | Yes (77%) | 00:55:19 |

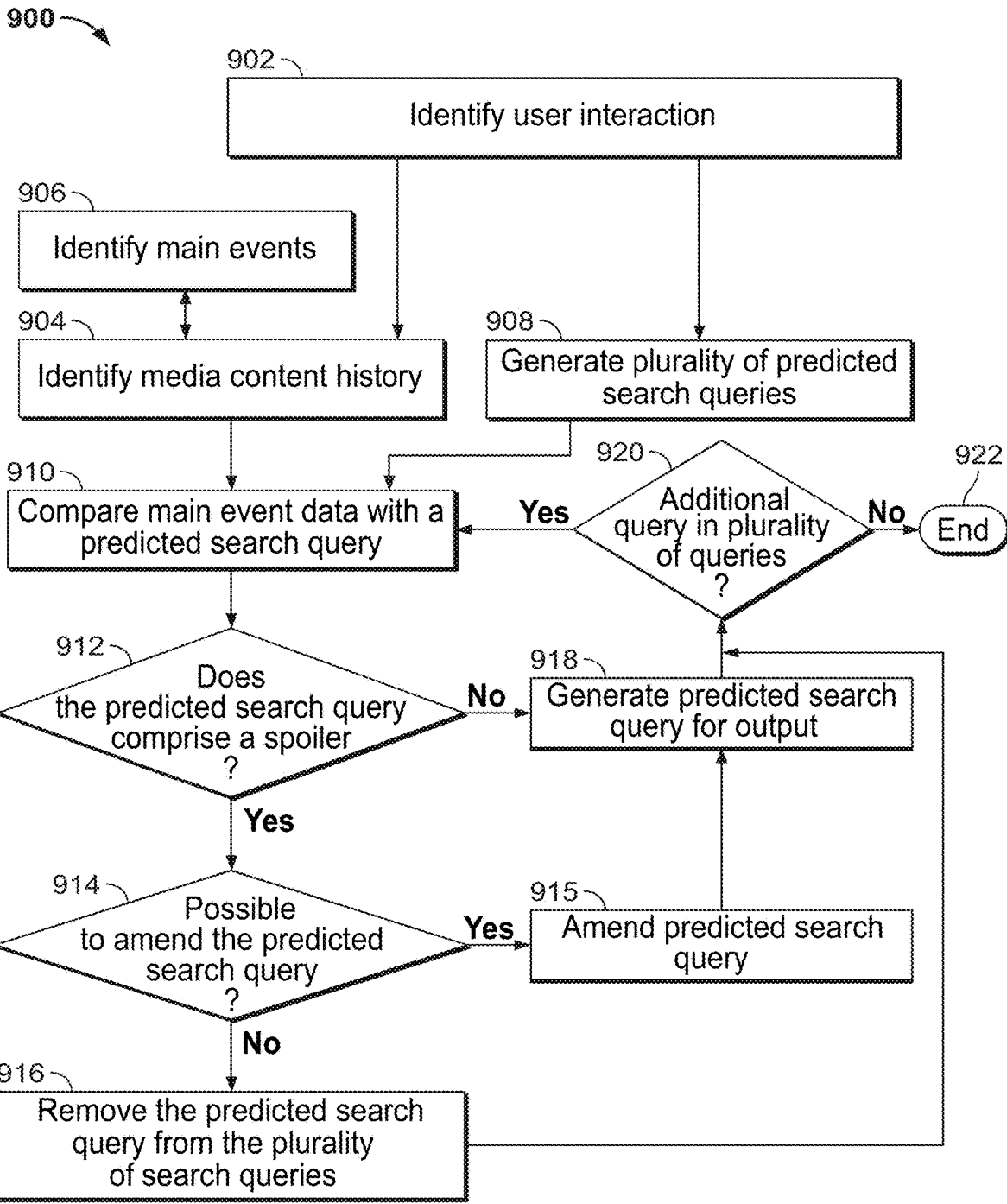

900

902 — Identify user interaction

906 — Identify main events

904 — Identify media content history

908 — Generate plurality of predicted search queries

910 — Compare main event data with a predicted search query

912 — Does the predicted search query comprise a spoiler ?

918 — Generate predicted search query for output

920 — Additional query in plurality of queries ?

922 — End

No → 918

Yes → 910

No → End

914 — Possible to amend the predicted search query ?

915 — Amend predicted search query

Yes → Amend predicted search query

No

916 — Remove the predicted search query from the plurality of search queries

FIG. 9

METHODS AND APPARATUSES FOR PREVENTING SPOILERS IN AUTOCOMPLETED SEARCH QUERIES

CROSS-REFERENCE TO RELATED APPLICATION(S)

This application is a divisional of U.S. patent application Ser. No. 17/589,338, filed Jan. 31, 2022, the disclosure of which is hereby incorporated by reference therein in its entirety.

BACKGROUND

The present disclosure relates to methods and systems for outputting autocompleted search queries and, more particularly, to methods and systems for outputting autocompleted search queries based on the media content history of a user.

SUMMARY

Some contemporary computing devices not only display content for users, but also include functionality that allows users to ask, and receive answers to, various questions via autocompleted search queries. This functionality allows users to speak or type queries or input text into the display system and receive autocompleted predictive queries. Thus, for instance, users can request a title of a show or movie they are currently watching, ask the system for the names of actors or actresses in a particular episode of content, or the like.

Such systems, while useful, are not without their drawbacks, though. Systems equipped with such functionality do not effectively answer many types of questions. In particular, such systems often provide answers using autocomplete, which may provide a spoiler or disclose a storyline or secret the user has not yet consumed. For example, searching for a popular TV series may lead to autocompleted queries comprising second-season spoilers of a show; however, the user may not yet have finished consuming the first season. User-friendly methods of handling such queries are still desired.

Systems and methods are described herein for preventing spoilers in autocomplete search queries. In accordance with some aspects of the disclosure, a first method is provided. The method includes, in response to detecting a user interaction at a computing device associated with a search query, identifying a media content history comprising one or more media content items. A predicted search query based on the user interaction and the media content history is generated for display at the computing device. The media content history may be aggregated from a plurality of media content sources. This addresses the issues associated with displaying spoilers in autocompleted search queries, by preventing them from being output at a computing device.

In some example systems, the predicted search query may be generated locally, at the computing device. In some examples, the predicted search query may be generated via an artificial intelligence accelerator such as, for example, a Google Tensor or a Samsung Exynos processor. The media content history may be stored at the computing device and accessed locally. In other examples, the media content history may be stored remote from the computing device and at least a subset of the media content history may be transmitted to the computing device via a network, such as the internet. In other example systems, the predicted search query may be generated at a server, remote from the computing device, and the predicted search query may be transmitted via a network, such as the internet, to the computing device, where it is generated for output. In some examples, at least a subset of the media content history may be transmitted to the server from the computing device, or another server, via a network, such as the internet.

In an example system, a search engine (e.g., Google) is accessed at a computing device, such as a smartphone, and a user interaction is detected at the smartphone, for example, a search query. Autocompleted suggestions, based on the search query, are generated. If, for example, a user searches for "good doctor Shaun br," then the autocompleted suggestions may include "good doctor Shaun breakdown," "good doctor Shaun brother dies," "good doctor Shaun breakup." A media content history associated with the user may be identified. For example, if a user has linked their Google account with the account of an over-the-top (OTT) provider (e.g., Netflix), then the user's Netflix viewing history may be accessed when they perform a search via the Google search engine. If, for example, the user's Netflix viewing history indicates that they are watching "The Good Doctor," then the autocompleted suggestions may be filtered to remove spoilers. The "brother dies" and/or "breakup" autocomplete suggestions may, for example, be filtered from the autocomplete suggestions before they are generated for display at the smartphone.

Generating the predicted search query may further comprise identifying main event data associated with the media content history. A plurality of predicted search queries may be generated based on the user interaction and the media content history. For at least a subset of the plurality of predicted search queries, the main event data may be compared with the predicted search query to identify whether the predicted search query comprises a spoiler for a media content item in the media content history. If the predicted search query comprises a spoiler, the predicted search query may be removed from the plurality of search queries, or any spoilers may be removed from the predicted search query. The main event data may further comprise media content item time data. Identifying the media content history may further comprise identifying a viewing position associated with at least a subset of the media content items of the media content history. Identifying whether the predicted search query may further comprise identifying a spoiler for the portion of a media content item that occurs after the identified viewing position, by comparing the main event data that occurs after the viewing position with the predicted search query.

The identified media content history may be associated with the computing device and generating the predicted search query may further comprise generating a predicted search query based on the identified computing device. The media content history may be associated with a user profile. Generating the predicted search query may further comprise generating, based on the media content history, a likelihood score of a media content item being accessed via the user profile. If the likelihood score is higher than a threshold value, it may be identified whether the predicted search query comprises a spoiler for the media content item associated with the generated likelihood score, and a filtered predicted search query may be generated by removing or altering any spoilers in the predicted search query. Generating the predicted search query for output may comprise generating the filtered predicted search query for output.

A first advertisement may be identified. It may be identified whether the first advertisement comprises a spoiler for a media content item in the media content history by comparing the content of the first advertisement to the main event data. If the first advertisement comprises a spoiler, a filtered advertisement may be generated by altering the first advertisement to remove any spoilers or requesting a second advertisement. The altered, or second, advertisement may be generated, at the computing device, for output.

In accordance with some aspects of the disclosure, a second method is provided. The method includes receiving a plurality of search queries. A topic associated with a media content item is identified from the plurality of search queries, and a tag, for the media content item, is generated based on the identified topic. The tag may be transmitted to a preview service, and a preview for a media content item may be generated based on the tag. The tag may be transmitted to a deep scene metadata service, and additional information for a media content item may be generated based on the tag.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 7 shows an example data structure for main event data, in accordance with some embodiments of the disclosure;

FIG. 9 shows another flowchart of illustrative steps involved in avoiding spoilers in autocompleted search queries, in accordance with some embodiments of the disclosure.

DETAILED DESCRIPTION

Figure 1:
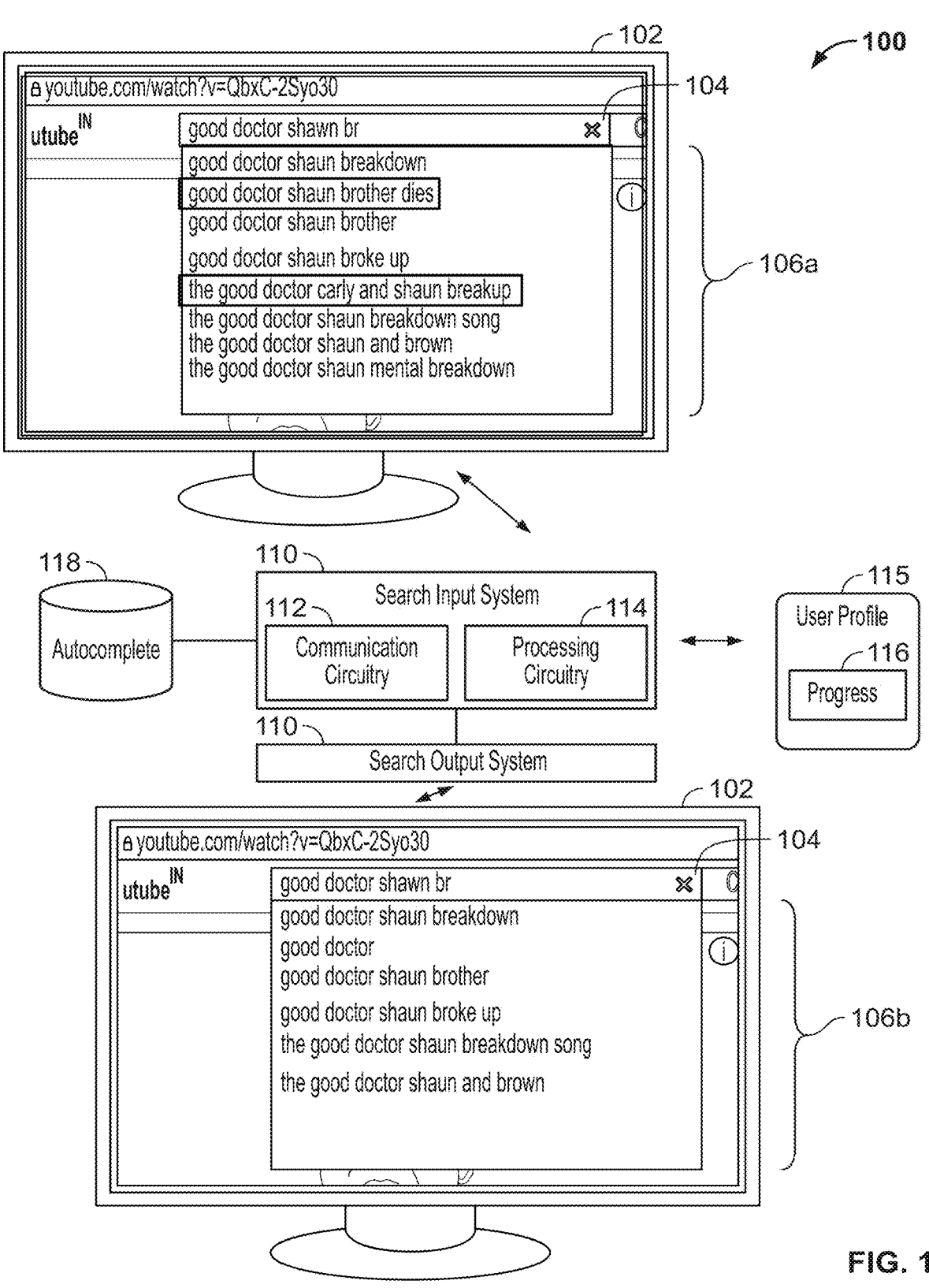
FIG. 1 shows an example environment in which spoilers in autocompleted search queries are avoided, in accordance with some embodiments of the disclosure.

Systems and methods are described herein for avoiding spoilers in autocompleted search queries. A user interaction may be any interaction with a computing device. For example, this may include touch events at a touchscreen of a computing device, input provided via a mouse and/or keyboard, voice input provided via a microphone, input provided via a virtual reality device, input provided via an augmented reality device and/or virtual input provided in a virtual reality environment. A media content history is any form of data indicating a progress through one or more media content items. For example, this may include a viewing history associated with a user profile, a viewing history associated with a user device and/or a viewing history associated with an OTT platform, such as Netflix. Media content items include audio, video and/or any other media content. Audio includes audio-only content, such as podcasts, stories and music. Video includes audiovisual content such as movies and/or television programs. A media content item may comprise a number of portions, or chapters. These portions may be identified in metadata associated with the media content item and may include titles and/or descriptions related to the content of the portion. The media content item may be of any suitable known format. One example of a suitable media content item is one that complies with the MPEG DASH standard.

A predicted search query is any search query that is predicted based on user input. Typically, an input will indicate a search query, such as "Dr," and a predicted search query may be generated based on the input, for example "Dr Who," "Dr House." The predicted search query may then be selectable by a user, to enable the user to save time as they do not need to input the whole search query. Predicted search queries may be generated in response to input at, for example, an internet search engine, such as Google and/or in a search function of an OTT application, such as a Netflix application running on a smart television. Main event data is any data that can be used to describe one or more portions of a media content item. Typically, main event data is stored in a structured data item. Main event data may comprise, for example, metadata and/or closed captions associated with a media content item and/or may be generated automatically and/or manually. Main event data may be generated by scraping websites and/or databases. In other examples, main event data may be generated by a trained computer learning algorithm that processes, for example, audio tracks and/or frames associated with the media content item. Spoilers are words and/or phrases associated with a media content item that indicate a plot development that may reduce surprise and/or suspense for a first-time consumer of the media content item. For example, if a main character were to be fired from their job at the end of an episode of a series, a spoiler would be a word and/or phrase that conveys this information.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an example environment 100 in which spoilers in autocompleted search queries are avoided, in accordance with some embodiments of the disclosure. The environment comprises a computing device, such as personal computer 102. The personal computer 102 may be connected to a network, such as the internet, and may comprise wired and/or wireless means for transmitting data to and from the personal computer 102. In this example, the personal computer 102 is generating the website YouTube for display. A search query, "good doctor shaun br," is entered into a search bar 104 of the website. In response to the search query being entered into the search bar 104, a plurality of predicted search queries 106a are generated (predicted search queries 106a are depicted in FIG. 1 in order to aid understanding; however, only the search queries 106b are generated for display at the personal computer 102), such as "good doctor shaun breakdown," "good doctor shaun brother dies" and "good doctor shaun brother." The plurality of predicted search queries 106a are based on the search query entered into the search box of the website. However, the search queries identified by the rectangular box, "good doctor shaun brother dies" and "the good doctor carly and shaun breakup" are potential spoilers. In order to prevent these queries from being generated for display at the personal computer 102, the predicted search queries are filtered by search input system 110.

The search input system 110 comprises communication circuitry 112 and processing circuitry 114. The communication circuitry 112 of the search input system 110 receives the input query 104 and transmits the query to an autocomplete engine 118 to generate a plurality of predicted search queries 106a, which are transferred back to the search input system via the communication circuitry 112. The search input system 110 accesses a user profile 115, wherein the user profile comprises a progress indication 116 associated with one or more media content items. For example, the progress indication may indicate whether or not a movie has been finished. In other examples, the progress indication may indicate a progress through a series of episodes and/or a progress through an individual episode. The communication circuitry 112 of the search input system 110 receives the user profile data, including the progress indicator(s) 116. At the search input system 110, the processing circuitry 114 determines whether any of the predicted search queries 106a generated by the autocomplete engine 118 comprise any spoilers based on the received progress indicator(s) 116. The processing circuitry 114 filters the generated predicted search queries 106a to remove any predicted search queries 106a comprising spoilers, to generate a filtered plurality of search queries 106b. In this example, the predicted search queries "good doctor shaun brother dies" and "the good doctor carly and shaun breakup" have been removed from the original plurality of predicted search results. The filtered plurality of search queries 106b are output by the search output system 120, where they are generated for display at the personal computer 102. All of the aforementioned steps may be performed at the personal computer 102 (or any other computing device). In another example, one or more of the aforementioned steps may be carried out at one or more servers remote from the computing device. Data may be transmitted to and from the computing device via a network, such as the internet. A server may be a physical server, a virtual machine and/or a combination of the two.

In some examples, a user profile for a social media account may be linked to a user profile for a media content service, such as an OTT service. By linking the two user profiles, a user may be provided with personalized recommendations, for example, based on what people on a friend list are watching, and/or may be able to compose a message, such as a tweet, about a media content item. In some examples, a single entity may own and operate a social media account and a media content service. In this example, profile data may be available from both services for a search engine that autocompletes predicted search queries as a user starts to type in the search box. Profile data may include viewing history and/or a viewing progress, e.g., within a television series. Profile data may differentiate between content that a user has consumed and content that a user is in the process of consuming. In some examples, a user interface associated with a search box may present an option to, for example, "Disable Spoilers in Search Suggestion."

Figure 2:
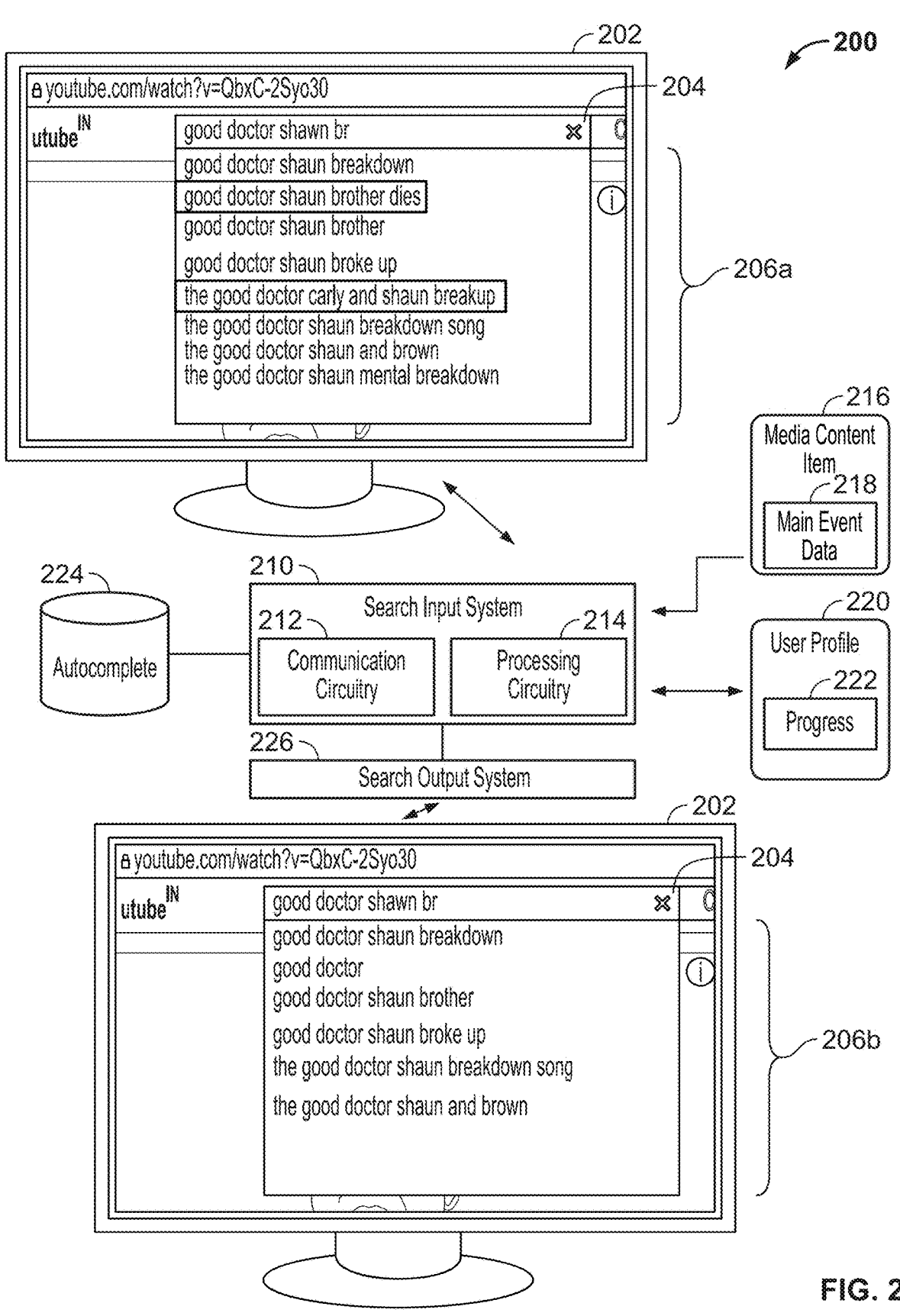
FIG. 2 shows another example environment in which spoilers in autocompleted search queries are avoided, in accordance with some embodiments of the disclosure.

FIG. 2 shows another example environment 200 in which spoilers in autocompleted search queries are avoided, in accordance with some embodiments of the disclosure. In a similar manner to the environment shown in FIG. 2, the environment comprises a personal computer 202, a search bar 204, a plurality of generated predicted search queries 206a (predicted search queries 206a are depicted in FIG. 2 in order to aid understanding; however, only the search queries 206b are generated for display at the personal computer 202), search input system 210, communication circuitry 212, processing circuitry 214, a user profile 220, progress indication 222, an autocomplete engine 224, a search output system 226 and predicted search queries 206b. In addition, the environment 200 comprises main event data 218 for one or more media content items 216. When the search input system 210 accesses the user profile to identify one or more media content items, the communication circuitry 212 accesses main event data 218 associated with the media content item 216. The main event data comprises data detailing the main events that occur in the media content item.

The main event data may be generated by a trained artificial intelligence algorithm that analyzes an audio track and/or frames associated with the media content item; manually by a human analyzing a media content item; scraped from websites; such as the Internet Movie Database; scraped from forums, wherein spoilers may be indicated by "spoiler" tags; and/or from metadata and/or closed captions associated with the media content item. The processing circuitry may compare the main event data with the predicted search queries 206a in order to determine whether or not any of the predicted search queries comprise spoilers. For example, if the main event data indicates that Shaun's brother dies in a media content item (e.g., an episode of a series), and a predicted search query comprises "shaun," "brother," and "dies" (or a variation on dies, such as dead and/or dying), then the predicted search query may be removed from the filtered plurality of predicted search queries 206*b*. As before, all of the aforementioned steps may be performed at the personal computer 202 (or any other computing device). In one example, a computing device, such as a smartphone, may comprise an artificial intelligence accelerator, such as Google Tensor, which may be used to analyze a media content item to identify main event data 218. In another example, one or more of the aforementioned steps may be carried out at one or more servers remote from the computing device. Data may be transmitted to and from the computing device via a network, such as the internet. A server may be a physical server, a virtual machine and/or a combination of the two.

The processing circuitry 214 may be configured to determine whether a user is searching for media content. In response to determining that a user is searching for media content, the communication circuitry 212 can be used to query the user profile 220 to determine whether a media content item is currently being received via a service, such as an OTT application. If a media content item is currently being consumed, a viewing progress within the media content item may be retrieved. The search input system 210 may transmit the viewing progress to the autocomplete engine 224, which may generate predicted queries based on the viewing progress. In addition, the main event data for the media content item may also be transmitted to the autocomplete engine 224, and the autocomplete engine 224 may use both the viewing progress and the main event data to exclude suggestions or search predictions that include keywords and/or tags associated with content that occurs after the progress indication (or content portions, where an episode has started being consumed, but not finished). In essence, the algorithm may generate predicted search queries based on a portion of the corpus associated with the TV series. In another example, the processing circuitry 214 may filter out predicted search queries with keywords (including permutations) that are associated with main event data for episodes of a series that have not been consumed.

In another example, a media profile may be utilized by a plurality of different users (e.g., dad, daughter and friend all share a single Netflix account). In addition to identifying a user profile, a unique identifier associated with a computing device (for example, via a user-agent request header) from which a search query was received may also be utilized by the processing circuitry 214. For example, if a certain tablet is used to access Netflix, and also to search for YouTube videos, then it is likely that the same user is performing both actions.

Figure 3:
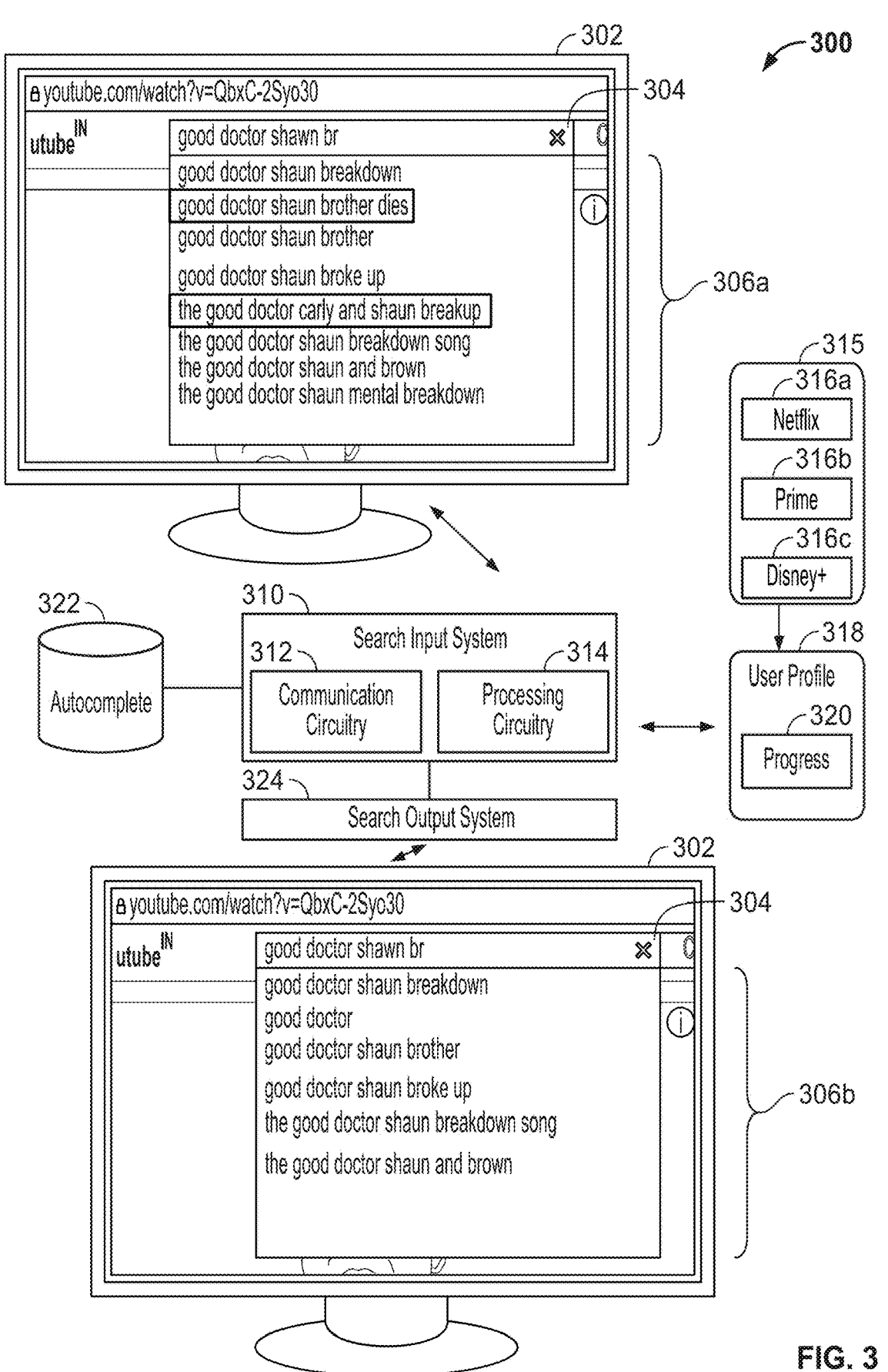
FIG. 3 shows another example environment in which spoilers in autocompleted search queries are avoided, in accordance with some embodiments of the disclosure.

FIG. 3 shows another example environment 300 in which spoilers in autocompleted search queries are avoided, in accordance with some embodiments of the disclosure. In a similar manner to the environments shown in FIGS. 1 and 2, the environment comprises a personal computer 302, a search bar 304, a plurality of generated predicted search queries 306*a* (predicted search queries 306*a* are depicted in FIG. 3 in order to aid understanding; however, only the search queries 306*b* are generated for display at the personal computer 302), search input system 310, communication circuitry 312, processing circuitry 314, a user profile 318, progress indication 320, an autocomplete engine 322, a search output system 324 and predicted search queries 306*b*. In addition, the progress indication 320 comprises progress indication associated with a plurality of content sources 315, such as OTT providers Netflix 316*a*, Amazon Prime 316*b* and Disney+ 316*c*. The progress indicators associated with user profiles of each of these content sources are aggregated, so that spoilers for content that has not been consumed can be avoided for more than one content source. The aggregated user profiles may be used to generate a universal user profile that is accessible via an application programming interface (API). All of the aforementioned steps may be performed at the personal computer 302 (or any other computing device). In another example, one or more of the aforementioned steps may be carried out at one or more servers remote from the computing device. Data may be transmitted to and from the computing device via a network, such as the internet. A server may be a physical server, a virtual machine and/or a combination of the two.

Figure 4:
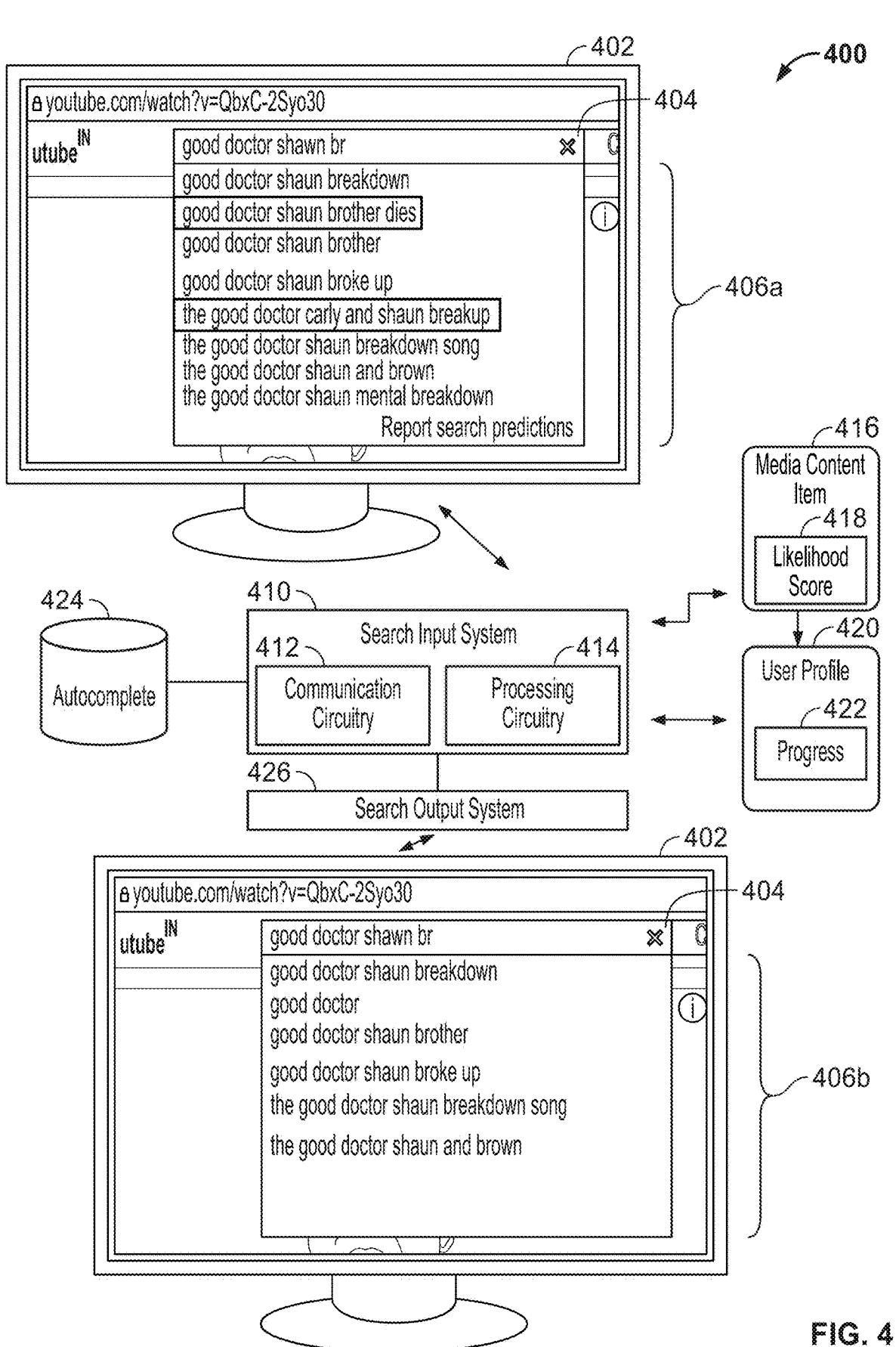
FIG. 4 shows another example environment in which spoilers in autocompleted search queries are avoided, in accordance with some embodiments of the disclosure.

FIG. 4 shows another example environment 400 in which spoilers in autocompleted search queries are avoided, in accordance with some embodiments of the disclosure. In a similar manner to the environments shown in FIGS. 1, 2 and 3, the environment comprises a personal computer 402, a search bar 404, a plurality of generated predicted search queries 406*a* (predicted search queries 406*a* are depicted in FIG. 4 in order to aid understanding; however, only the search queries 406*b* are generated for display at the personal computer 402), search input system 410, communication circuitry 412, processing circuitry 414, a user profile 420, progress indication 422, an autocomplete engine 424, a search output system 426 and predicted search queries 406*b*. For each media content item in the user profile, the communication circuitry 412 transmits an indication of the media content item to a likelihood score generation engine 418. At the likelihood score generation engine 418, a likelihood value is generated, based on the transmitted media content item, indicating how likely it is that related media items will be viewed. For example, if a user profile indicates that a user has recently watched season 1, episode 3 of a show, a high likelihood score will be generated for episode 4 of the season. Likewise, it may be identified, based on user viewing habits, that a user who watches, for example, "Euphoria," may be likely to watch "Looking for Alaska" since the shows are related genres. A high likelihood score may be generated for "Looking for Alaska," even though the user profile does not indicate that it has been watched. The search input system 410 may take the likelihood score into account when filtering the autocomplete search queries. For example, media content items with a likelihood score over a threshold of, for example, 80% may be treated in a similar manner to media content items that the user profile 420 indicates have been watched. Main event data may be generated for media content items with a high likelihood score, or a likelihood score that is over a threshold amount. In this way, spoilers in generated predicted search queries may also be avoided for media content items that a user is likely to consume in the future. All of the aforementioned steps may be performed at the personal computer 402 (or any other computing device). In another example, one or more of the aforementioned steps may be carried out at one or more servers remote from the computing device. Data may be transmitted to and from the computing device via a network, such as the internet. A server may be a physical server, a virtual machine and/or a combination of the two.

Figure 5:
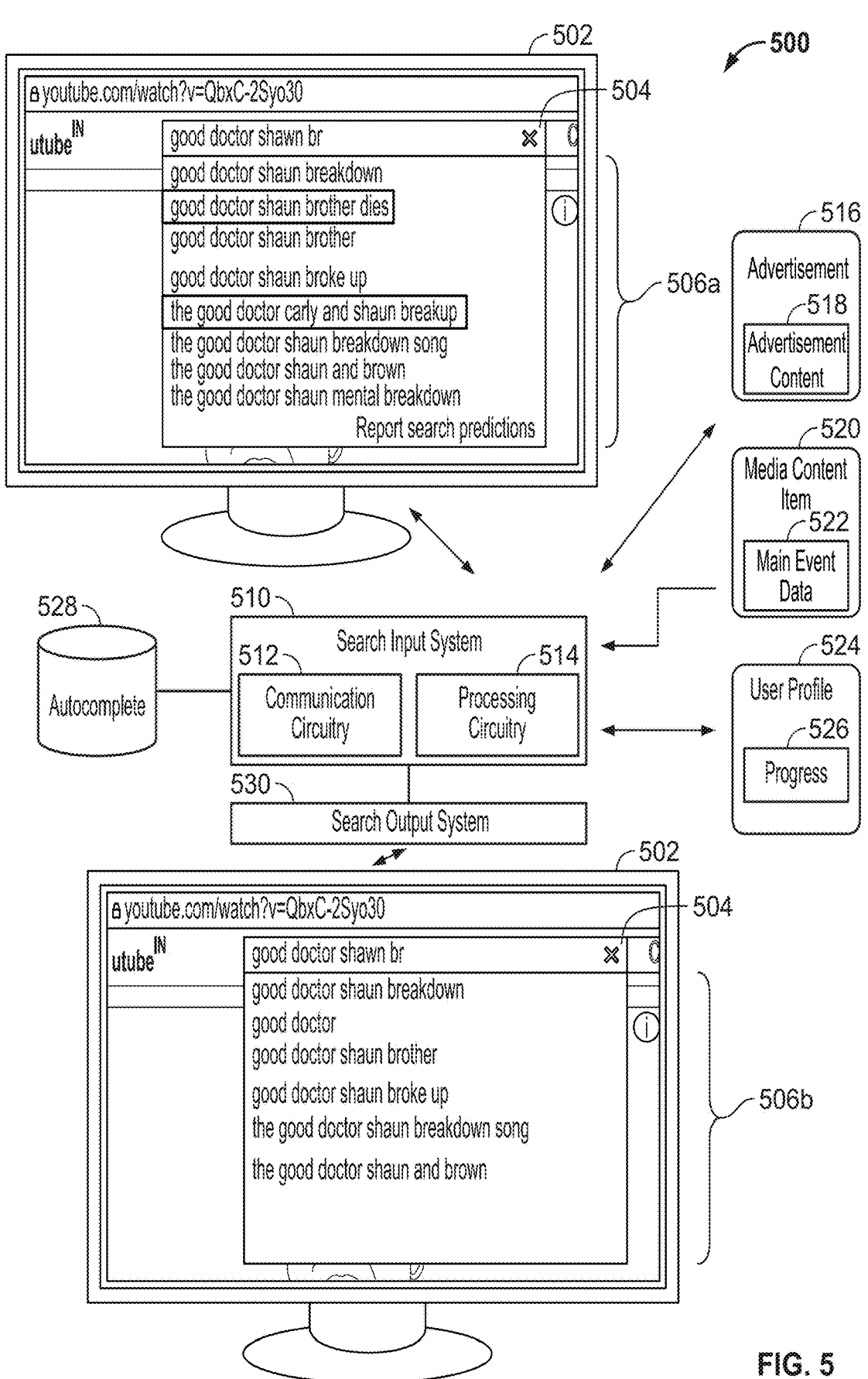
FIG. 5 shows another example environment in which spoilers in autocompleted search queries are avoided, in accordance with some embodiments of the disclosure.

FIG. 5 shows another example environment 500 in which spoilers in autocompleted search queries are avoided, in accordance with some embodiments of the disclosure. In a similar manner to the environments shown in FIGS. 1-4, the environment comprises a personal computer 502, a search bar 504, a plurality of generated predicted search queries 506*a* (predicted search queries 506*a* are depicted in FIG. 2 in order to aid understanding; however, only the search queries 506*b* are generated for display at the personal computer 502), search input system 510, communication circuitry 512, processing circuitry 514, media content item 520, main event data 522, a user profile 524, progress indication 526, an autocomplete engine 528, a search output system 530 and predicted search queries 506b. When the search input system 510 accesses the user profile 524 to identify one or more media content items, the communication circuitry 512 accesses main event data 522 associated with the media content item 520. In addition, an advertisement 516 is identified and transmitted, via the communication circuitry 512, to the search input system. In a manner similar to how the main event data 522 is generated, the advertisement 516 is analyzed to determine the content of the advertisement, for example through image and/or voice recognition. The search input system 510 may process the advertisement content 518 via processing circuitry 514 to determine whether the advertisement comprises any spoilers, in a similar manner to how the predicted search queries 506a are analyzed. For example, the advertisement content 518 may be compared to the main event data 522 for a media content item 520 in order to identify any spoilers. If the advertisement 516 comprises a spoiler, the advertisement 516 may be altered to remove the spoiler, or, a different advertisement may be requested. Once it is identified that the advertisement does not comprise any spoilers, the advertisement may be transmitted to the computing device 502 via the search output system 530 or may be transmitted to the computing device 502 independently from the search output system 530. All of the aforementioned steps may be performed at the personal computer 502 (or any other computing device). In another example, one or more of the aforementioned steps may be carried out at one or more servers remote from the computing device. Data may be transmitted to and from the computing device via a network, such as the internet. A server may be a physical server, a virtual machine and/or a combination of the two.

In an example, a progress indication associated with a user profile may also be communicated to a recommendation algorithm that generates suggestions of related videos to watch after a media content item has been consumed, or selected. The recommendation algorithm may take into account that a user has started consuming a media content item (or a series of media content items) and remove unseen portions, or episodes, of media content items from the recommendation. In another example, the recommendation algorithm may avoid recommending popular videos that a user is likely to consume, based on the media content history associated with the user profile, in order to avoid, for example, displaying spoilers associated with the popular videos.

In an example, a first recommendation engine associated with a television service may transmit recommendation parameters to a second recommendation engine associated with a social network or a video sharing website. For example, the first recommendation engine might indicate that "The Good Doctor" is a content item that is highly relevant to a linked user profile based on, for example, an assigned weight. In such scenario, any media content items that the second recommendation engine recommends may be general in nature (e.g., trailers) or heavily focused on the first episode of the series, for example. In another example, the first and second recommendation engines may communicate with each other in order to advertise, via, for example, the second recommendation engine, a media content item that is available on a television service that is associated with the user profile. Such advertisement may include media content items that are accessible to the user only via a package upgrade on their television service or an add-on (e.g., Starz, HBO add-on). Advertisements may be in the form of short videos, or clips, about a media content item in a "Related" section of an OTT application, or by highlighting videos on a "For You" page, for example.

Figure 6:
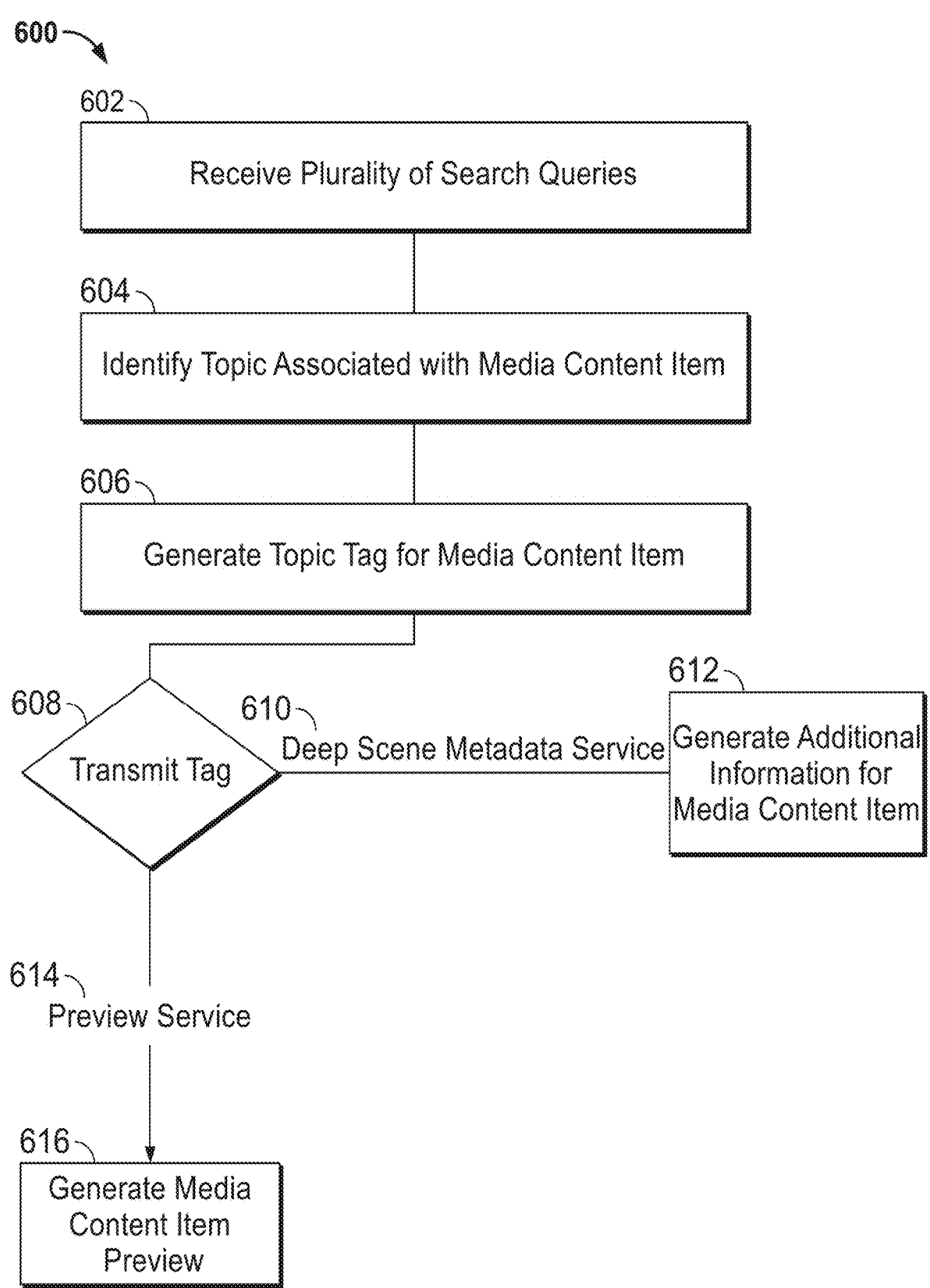
FIG. 6 shows a flowchart of illustrative steps involved in avoiding spoilers in autocompleted search queries, in accordance with some embodiments of the disclosure.

FIG. 6 shows a flowchart of illustrative steps involved in avoiding spoilers in autocompleted search queries, in accordance with some embodiments of the disclosure. Process 600 may be implemented on any computing device. In addition, one or more actions of the process 600 may be incorporated into or combined with one or more actions of any other process or embodiments described herein. At 602, a plurality of search queries are received, and at 604 a topic associated with a media content item is identified. For example, if a rebel ship has been defeated in the latest episode of "The Expanse," then there may be a plurality of search queries being input with respect to the defeat of the rebel ship. At 606, a topic tag may be identified. In this example, the topic tag may be "rebel ship defeated." At 608, the tag is transmitted to a deep scene metadata service 610, and/or a preview service 614. At 612, additional information is generated for the media content item, for example, the actor who plays the captain of the rebel ship. This additional information may be utilized by an OTT media player in order to provide additional information about the actors (or actresses) of an episode in response to a user input. At 616, a media content item may be generated for preview by the preview service 614. For example, when a viewing progress is close to the end of an episode, an "up next" thumbnail may be generated. The preview service 614 may generate this preview based on the tag identified from the plurality of search queries. For example, the preview may indicate that someone survived the rebel ship being destroyed.

In one example, an analytics service may use search prediction data to determine which topics associated with a television series are commonly searched for. For example, the search suggestions "brother dies" or "shaun breakdown" are essentially tags that can be linked back to a given portion of an episode in a season. This data can then be utilized by a service (e.g., a coming-up-next service) that generates previews for the next episode in a series. For example, a snippet of the next episode at the end of the current episode may be generated to keep a user interested in the content. The snippet may be determined based on scenes associated with keywords that are commonly generated in the predicted search queries and are associated with a specific episode.

The search corpus associated with a television series may be used to generate a list of characters in order to offer deep scene metadata to viewers and/or trivia. For example, media content items associated with popular tags can be further processed in order to detect objects (using, for example, object detection algorithms known in the art), and trivia questions can be generated based on them.

FIG. 7 shows an example data structure 700 for main event data, in accordance with some embodiments of the disclosure. The data structure may comprise a Title field 702, a Main Event Identification field 704, a Main Event Description field 706, a Plot Keywords field 708, a Spoiler field 710 with a corresponding confidence level and/or a Time Stamp field 712. The Title field 702 may indicate a title of the media content item. This may optionally include additional data such as, for example, a season and episode associated with the media content item. The Main Event Identification field 706 may comprise any data used for identifying a main event in a media content item. This data may be unique for each main event item analyzed, such that a main event item associated with a media content item may be referred to by the Main Event Identification field 704 only. The Main Event Description field 706 describes the main event. This field may be manually and/or automatically populated. Where the field is manually populated, the data may be generated by a trained artificial intelligence algorithm, taken from metadata associated with the media content item and/or scraped from the internet. The Plot Keywords field 708 identifies keywords (or tags) associated with the main event. Again, this field may be automatically and/or manually populated. The Spoiler field 710 indicates whether a main event comprises a spoiler. For example, a main event may comprise many characters arriving at a wedding; however, if a previous episode of a series comprised the characters preparing for the wedding, it is unlikely that this would comprise a spoiler. In this example, data indicating that the main event does not comprise a spoiler would be stored in this field, with a relatively high confidence level, for example 85%. If for example, a main event comprised a bride not turning up to the wedding, then it is likely that this does comprise a spoiler. In this example, data indicating that the main event does comprise a spoiler would be stored in this field, with a relatively high confidence level, for example 95%. The Time Stamp field 712 comprises time data associated with the main event. For example, the data may include a start time of the main event, a finish time of the main event and/or a duration of the main event.

The main events associated with media content items may be generated for every media content item that is accessible to a general search engine. In another example, main events may be generated for a subset of the media content items that are accessible. A main events list may be associated with each episode of a series, and the main events list may include, for example, plot keywords (e.g., tags such as "childhood flashback," "Carly and Shaun breakup"). Such keywords may be generated through text mining and/or analysis via, for example, closed-caption data for a media content item, video and/or audio processing, or via media databases (e.g., the Internet Movie Database) that host storylines, user and/or critic reviews. The media events data structure may be populated with data that is received via APIs. This data can be used to generate short topics, or keywords or tags related to important plots in a media content item. Additionally, the data may be generated manually.

In another example, the main event data structure may store keywords and/or tags in a manner that associates the keywords with timing information within the media content item (e.g., childhood flashback occurs at 40 minutes 10 seconds within the episode). In this way, spoilers can be avoided for parts of a media content item that have not yet been consumed.

Figure 8:
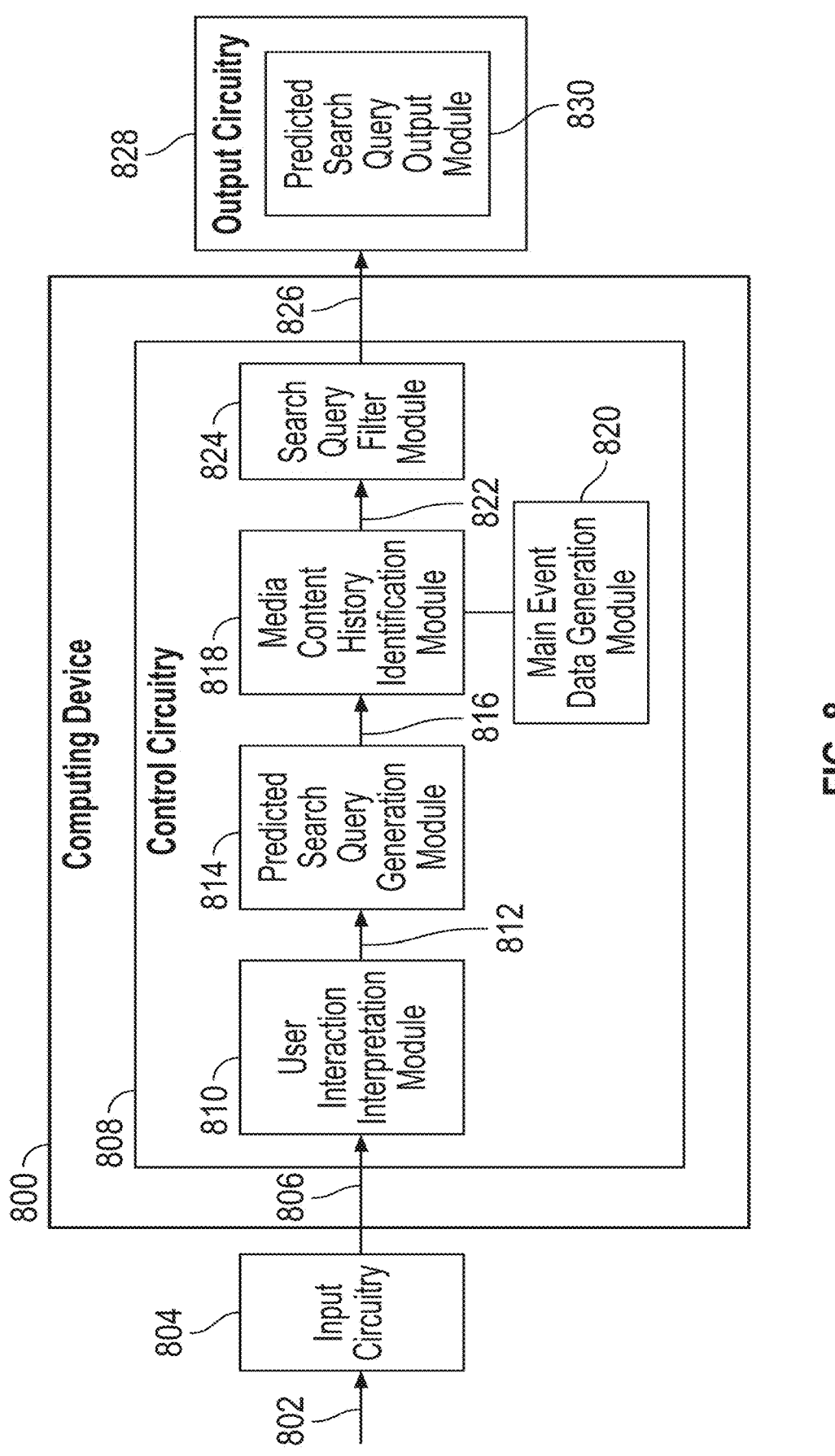
FIG. 8 shows a block diagram representing components of a computing device and data flow therebetween for avoiding spoilers in autocompleted search queries, in accordance with some embodiments of the disclosure.

FIG. 8 shows a block diagram representing components of a computing device and data flow therebetween for avoiding spoilers in autocompleted search queries, in accordance with some embodiments of the disclosure. Computing device 800 (e.g., tablet device 102, 202, 302, 402, 502) as discussed above comprises input circuitry 804, control circuitry 808 and an output module 828. Control circuitry 808 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

A user interaction 802 is received by the input circuitry 804. The input circuitry 804 is configured to receive user interface inputs related to a computing device. For example, this may be via a touchscreen, keyboard, mouse, microphone, infra-red controller and/or Bluetooth controller of the computing device 800. The input circuitry 804 transmits 806 the user interface input to the control circuitry 808.

The control circuitry 808 comprises user interaction interpretation module 810, a predicted search query generation module 814, a media content history identification module 818, a main event data generation module 820, and a search query filter module 824. The user interface input is transmitted 806 to the user interaction interpretation module 810. At the user interaction interpretation module 810, the user interaction is interpreted, for example, a touch screen event is interpreted as a user generated a query via a virtual keyboard. The generated query is transmitted 812 to the predicted search query generation module 814, where a plurality of predicted search queries are generated. The plurality of predicted search queries are transmitted 816 to the media content history identification module 818, where media content items associated with a user profile are identified. In addition, main event data is received from the main event data generation module 820. The plurality of predicted search queries, the identified media content items and the main event data are all transmitted 822 to the search query filter module 824, where the plurality of predicted search queries that were generated at 814 are filtered to remove predicted search queries comprising a spoiler. The filtered predicted search queries are transmitted 826 to the output circuitry 828, where the filtered predicted search queries are generated for display by the predicted search query output module 830.

FIG. 9 shows another flowchart of illustrative steps involved in avoiding spoilers in autocompleted search queries, in accordance with some embodiments of the disclosure. Process 900 may be implemented on any of the aforementioned computing devices (e.g., tablet device 102, 202, 302, 402, 502). In addition, one or more actions of the process 900 may be incorporated into or combined with one or more actions of any other process or embodiments described herein.

At 902, a user interaction with a computing device is identified, for example, a user inputting a search query. At 904, a media content history associated with a user profile, or physical computing device, is identified. The media content history may comprise media items, such as watched episodes of a season. At 906, main events associated with the media items of the media content history are identified. For example, main events of unwatched episodes of a season are identified. At 908, a plurality of predicted search queries are generated based on the received user interaction. At 910, the main event data is compared with a predicted search query. At 912, it is identified whether the predicted search query comprises a spoiler for one or more media content items based on the media content history. For example, a spoiler for an unwatched episode of a season. If the predicted search query does comprise a spoiler, it is determined whether it is possible to amend the predicted search query to remove the spoiler. If it is not possible to amend the query, then, at 916, the predicted search query is removed from the plurality of search queries and it is identified, at 920, whether there are any additional queries in the plurality of predicted search queries. If there are not, the process ends; however, if there is an additional predicted search query, the process returns to 910, where the next predicted search query is compared with the main event data. If at 912, the predicted search query does not comprise a spoiler, then the predicted search query is generated for output at 918, and it is identified whether there are any additional queries in the plurality of queries at 920, as before. If at 914, it is determined that it is possible to amend the predicted search query to remove the spoiler, then the search query is amended at 915, the predicted search query is generated for output at 918, and it is identified whether there are any additional queries in the plurality of queries at 920, as before.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be example and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
receiving a plurality of search queries;
determining that each respective search query of the plurality of search queries comprises a title of a media content item and an indication of an event depicted in the media content item wherein the media content item is an episode of a series, and the title of the media content item corresponds to a title of the series, and wherein the episode is a latest episode of the series;
based at least in part on determining that each respective search query of the plurality of search queries comprises the title of a media content item and the indication of the event depicted in the media content item, generating, for the media content item, a tag based at least in part on the identified indication;
generating a preview for the media content item, wherein the preview comprises a video preview, and wherein the preview is generated based at least in part on the tag corresponding to the identified indication of the event depicted in the media content; and
causing a device to display the generated preview for the media content item.

2. The method of claim 1, wherein the media content item is a first content item, and the method further comprises:
determining that a second media content item related to the first media content item is currently being consumed on the device corresponding to a user profile;
detecting that a current viewing position within the second media content item corresponds to an end of the second media content item; and

based at least in part on the detecting, performing the causing of the device to display the preview for the first media content item.

3. The method of claim 2, wherein the determining that the second media content item related to the first media content item is currently being consumed on the device corresponding to the user profile further comprises accessing a media content history corresponding to the user profile.

4. The method of claim 1, further comprising:
transmitting the tag to a deep scene metadata service; and
receiving additional information corresponding to the media content item, wherein the additional information is generated based at least in part on the tag.

5. The method of claim 4, further comprising:
identifying a plurality of media content items associated with the identified indication; and
identifying objects within the plurality of media content items associated with the identified indication, using one or more object detection algorithms, wherein the generating of the additional information corresponding to the media content item is based at least in part on the identified objects.

6. The method of claim 4, wherein the additional information corresponding to the media content item comprises one or more of: a list of characters related to the media content item, information about actors corresponding to the media content item, or trivia related to the media content item.

7. The method of claim 4, further comprising:
generating for display the additional information corresponding to the media content item during playing of the media content item.

8. The method of claim 1, further comprising:
determining a time within the media content item which corresponds to a spoiler; and
storing the tag in association with a time within the media content item other than the determined time within the media content item which corresponds to the spoiler.

9. The method of claim 1, further comprising:
storing a data structure indicating:
a description of the event depicted in the media content item; and
the title of the media content item,
wherein determining that each respective search query of the plurality of search queries comprises the title of a media content item and the indication of the event depicted in the media content item comprises, for each respective search query of the plurality of search queries:
comparing a first portion of the respective search query to the title of the media content item to identify a correspondence; and
comparing a second portion of the respective search query to the description the event depicted in the media content item to identify a correspondence.

10. A system comprising:
a communication port;
a memory storing instructions;
control circuitry communicably coupled to the memory and the communication port and configured to execute the instructions to:
receive a plurality of search queries;
determine that each respective search query of the plurality of search queries comprises a title of a media content item and an indication of an event depicted in the media content item wherein the media content item is an episode of a series, and the title of the media content item corresponds to a title of the series, and wherein the episode is a latest episode of the series;

based at least in part on determining that each respective search query of the plurality of search queries comprises the title of a media content item and the indication of the event depicted in the media content item, generate, based at least in part on the identified indication, a tag for the media content item;

generate a preview for the media content item, wherein the preview comprises a video preview, and wherein the preview is generated based at least in part on the tag corresponding to the identified indication of the event depicted in the media content; and cause a device to display the generated preview for the media content item.

11. The system of claim 10, wherein the media content item is a first content item, and the control circuitry is further configured to:

determining that a second media content item related to the first media content item is currently being consumed on the device corresponding to a user profile;

detecting that a current viewing position within the second media content item corresponds to an end of the second media content item; and based at least in part on the detecting, performing the causing the device to display the preview for the first media content item.

12. The system of claim 11, wherein the control circuitry is further configured to determine that the second media content item related to the first media content item is currently being consumed on the device corresponding to the user profile by accessing a media content history corresponding to the user profile.

13. The system of claim 10, wherein the control circuitry is further configured to:

transmit the tag to a deep scene metadata service; and receive additional information corresponding to the media content item, wherein the additional information is generated based at least in part on the tag.

14. The system of claim 13, wherein the control circuitry is further configured to:

identify a plurality of media content items associated with the identified indication; and identify objects within the plurality of media content items associated with the identified indication, using one or more object detection algorithms, wherein the generating of the additional information corresponding to the media content item is based at least in part on the identified objects.

15. The system of claim 13, wherein the additional information corresponding to the media content item comprises one or more of: a list of characters related to the media content item, information about actors corresponding to the media content item, or trivia related to the media content item.

16. The system of claim 13, wherein the control circuitry is further configured to:

generate for display the additional information corresponding to the media content item during playing of the media content item.

17. The system of claim 10, wherein the control circuitry is further configured to:

determine a time within the media content item which corresponds to a spoiler; and store the tag in association with a time within the media content item other than the determined time within the media content item which corresponds to the spoiler.

18. The system of claim 10, wherein the control circuitry is further configured to:

store a data structure indicating:

a description of the event depicted in the media content item; and the title of the media content item, determine that each respective search query of the plurality of search queries comprises the title of a media content item and the indication of the event depicted in the media content item by, for each respective search query of the plurality of search queries:

comparing a first portion of the respective search query to the title of the media content item to identify a correspondence; and comparing a second portion of the respective search query to the description of the event depicted in the media content item to identify a correspondence.

* * * * *